United States Patent [19]
Finck

[11] 3,912,190
[45] Oct. 14, 1975

[54] AUTOMATIC MACHINE FOR MANUFACTURING ELECTRIC CAPACITORS

[76] Inventor: Robert Finck, 40 Route de Troyes, Talant, France

[22] Filed: Jan. 13, 1972

[21] Appl. No.: 217,500

[30] Foreign Application Priority Data
Jan. 23, 1971  Italy.................................. 3317/71

[52] U.S. Cl............................. 242/56.1; 29/25.42
[51] Int. Cl.²..................... H01G 13/02; H01G 7/00; B65H 39/16
[58] Field of Search.................... 242/56.1; 29/25.42

[56] References Cited
UNITED STATES PATENTS

| | | | |
|---|---|---|---|
| 1,940,847 | 12/1933 | Danziger............................ | 242/56.1 |
| 2,310,071 | 2/1943 | Frisch................................ | 242/56.1 |
| 2,710,441 | 6/1955 | Heyman......................... | 242/56.1 X |
| 2,916,224 | 12/1959 | Larsen............................... | 242/56.1 |
| 3,367,594 | 2/1968 | Jannett.............................. | 242/56.1 |
| 3,432,901 | 3/1969 | Fanning............................ | 242/56.1 |

*Primary Examiner*—George F. Mautz
*Attorney, Agent, or Firm*—Ernest G. Montague; Karl F. Ross; Herbert Dubno

[57] ABSTRACT

A machine for the automatic winding of interleaved pairs of dielectric and conductive strips into a capacitor coil comprises two rotatable mandrels mounted at diametrically opposite locations on a headstock also carrying two diametrically opposite anvils alternately coacting with a cutter blade, the mandrels being axially split to form jaws for gripping a stack of strips delivered to them by a pair of coacting but separable guide rollers disposed upstream of the headstock. The pair of dielectric strips and an outer conductive strip are led toward the headstock over respective guide-paths converging at the guide rollers forming an entrance throat therebetween; a reciprocable carriage, engaging by suction the leading end of the other, inner conductive strip, introduces the latter into the throat between the momentarily separated guide rollers and the two dielectric strips for frictional entrainment thereby across the nearer one of the two mandrels which thereupon engages the stacked strips and winds them into a coil while being supported in a confronting tailstock. Another cutting mechanism, upstream of the guide rollers, severs the inner conductive strip whereupon the headstock turns through 180° to remove the loaded mandrel from the vicinity of the guide rollers while placing the other mandrel in its position, the loaded mandrel continuing its rotation to wind up the trailing end of the inner conductive strip whereupon the other strips are cut by the downstream blade and the coil body is taped and discharged from its mandrel.

9 Claims, 5 Drawing Figures

AUTOMATIC MACHINE FOR MANUFACTURING ELECTRIC CAPACITORS

This invention relates to an automatic machine for manufacturing electric capacitors of wound type, particularly electrolytic capacitors or the like.

The term "capacitors of wound type" refers to coiled capacitors composed of a stack of juxtaposed strips of dielectric and conductive material, wound together. Generally, there are at least four strips alternately juxtaposed - dielectric, conductor, dielectric, conductor - which are contemporaneously wound on a provisional support in such a way as to form a cylindrical body or cartridge. That body is then placed inside a box-shaped casing provided with two mutually insulated terminals to which the two conductor strips of the winding are fastened. In the ensuing text I shall simply refer to strips, which are generally made of paper, as "paper strips" and to the conductor strips as "cathode" and "anode," insofar as electrolytic capacitors are concerned, though this is not to be construed as a limitation.

The object of my invention is, therefore, to provide a machine for automatically producing such capacitor windings, complete and ready to be inserted into their respective box-shaped containers.

There exist at present serious difficulties in designing machines of this type, for producing electrolylic-capactior windings, particularly when their dimensions are very small, as is the case for electronic circuits and equipment calling, on one hand, for extremely thin strips to be wound - on the order of hundredths of a millimeter - which make them very delicate to handle and, on the other, hand, for a high degree of precision in making such windings.

Furthermore, special problems arise from the requirements that:

a. at least one of the two conductor strips has to be shorter than the paper strips, so that their mutual insulation is ensured;

b. at least the anode has to be of a precisely calculated length, since the capacitance of the finished capacitor is determined by this dimension:

c. tabs, or connection terminals, have to be fixed to each of the conductor strips, at a predetermined location along the strip.

At present, the manufacture of this type of winding is largely based on the use of so called "semi-automatic" machines. These are machines comprising a set of supports, each one carrying a roll of the strip to be wound; means with which to wind them, generally in the form of an arbor or rotatable spindle; means with which to secure the strips to the rotatable spindle; and means with which to measure, and cut to size, the lengths of strip to be wound. On such a machine, the operator takes hold of the free ends of the four strips to be wound, juxtaposes them in the correct sequence (dielectric - conductor - dielectric - conductor), puts them on the rotatable mandrel, locks the fixing devices and sets the machine in motion. The winding operation proceeds until the aforementioned measurement devices find that a predetermined length of anode has been wound whereupon instructions are given to a first cutting mechanism for sever anode which thus ceases to be infed. the winding operation then continues briefly until one or two turns of paper strip have been superimposed over the termination of the anode. In the meantime, a second cutting mechanism will have come into operation to cut the other strips to size. At this stage, the operator has again to intervene and to dislodge the finished winding from the rotatable mandrel, seal it and fix it. Thereafter, a fresh cycle is commenced.

It is obvious that an operator is required for each such winding operative machine and that the dead times at the beginning and end of each winding noticeably affect the final costs of the capacitors produced in this way.

Recently, however, capacitor-winding machines have become available which make the winding operation almost fully automatic. These winding machines are all based on the use of a headstock with two rotatable mandrels. The various strips are infed on these machines along two convergent paths to the first mandrel where the first winding is produced and, as soon as it has been completed, the headstock rotates and then carries the second mandrel on to the infeed paths of each of the strips which are thus deviated from their respective liness tracks and are united for at least a brief common run. The second mandrel then takes a firm hold on the various strips, before they are cut, for allowing the first coil to be sealed.

Immediately after this, a coil winding of a second coil is commenced on the second mandrel while independent automatic devices dislodge the completed first coil. Thus, with this type of construction, not only are the initial and final winding operations rendered automatic but dead times are also included in the actual winding time.

Machines of this type, however, are highly complex from a constructional point of view, modest in their precision and operational regularity and limited in their uses. The following are the main points in connection with the above:

1. Each of the rotatable mandrels on the rotating headstock is constituted by a cylindrical pin, split axially into two parts; each of the two parts, which thus has a semi-circular section, is movable axially, independently of the other. To dislodge a completed coil, the said two pin portions are axially displaced, together, and are extracted from the winding which is then held axially in a fixed position. When commencing a fresh coil, only one of the two mandrel parts is initially returned to the working position by a reverse axial displacement. As the head rotates, the latter part is located, as mentioned, in the vicinity of the infeed path of the strips and bears on them with its flat surface when the first coil has been completed, deflecting these strips from their respective alignment positions and grouping them into a stock. Only at this moment is the second part of the mandrel also advanced axially and its flat surface comes into contact with the other side of the stack, thus enclosing the strips even though not tightly - between the two parts of the mandrel, so that the strips can subsequently be cut while moving together between the second and the first mandrel. As can easily be understood, this structure - which has to allow the independent axial displacement of the two parts of the mandrel as well as their rotation for winding - is rather complicated to manufacture, delicate to use and awkward from a movement-synchronization point of view.

As already stated, when winding electrolytic capacitors, it is essential that the strip forming the anode be shorter than the others; otherwise the insulation would be impared. For this purpose, the aforementioned two separate cutting mechanism are provided and one of these is used solely for the anode. The anode can, therefore, be cut at its trailing and before the others which, particularly in the case of the paper strips, are carried on for one or two more turns past the end of the anode prior to also being cut. While the tail end of the anode does not cause any real difficulty, the problem of starting the windup of a new anode strip is more complex. In fact, according to what has been stated in the foregoing, each mandrel initiating a winding operation grips and moves only the paper strips and the cathode.

Thus, on conventional machines, the procedure is for each mandrel, at the beginning, to wind just the paper strips and the cathode for two or three turns and for an infeed unit - preferably provided with grippers - to grasp the free end of the anode and place it in contact with the periphery of the pre-wound strips so as to wedge it in position at the point where the strips are taken for winding from their rectilinear infeed paths. As can easily be appreciated, the end of the anode is then held - between the strips actually wound and those about to be wound - and is carried along in rotation. For this technique, however, extremely high precision is indispensable both for the construction and the timing of all the moving parts and, in particular, for the cutting of the conductor strips along lines perpendicular to their edges.

Finally, it should also be pointed out that a structural characteristic of this machine calls for the anode infeed gripper to be adjusted in such a way as to carry the anode, following a tangential alignment with the coil body, toward the wedging position. It is, however, clear that this wedging position is constantly being altered - as the diameter of the winding increases - and thus is moving radially away from the coil axis. Under these circumstances, as can be readily understood, the gripper infeed adjustment is effective only at the beginning of the winding operation. This obviously limits the use of the machine to producing single-anode capacitors and precludes multiple-anode capacitors from being made on it since, after the winding of a first anode, the infeed gripper would no longer be able to insert the other anodes correctly, owing to the reason given above.

All the above-mentioned problems are eliminated by the automatic machine according to this invention which is of the general type referred to above, i.e., which has a headstock with two rotatable mandrels; at the same time, however, it is constructionally more simple and offers high operating precision. This particular machine includes, above all, improved means for infeeding the anode - i.e. the shorter conductor strip - in between two paper strips in the stack to be coiled and, each time a fresh winding operation is commenced, to cause the free end of the anode to be infed to a point upstream of the pressure devices used to group and lock the stacked strips together in such a way that, as the paper strips move, they frictionally entrain the anode.

As can be easily understood, this arrangement dispenses with all problems pertaining to the fastening of the anode at the time the winding operation is commenced. When the machine is at standstill, the free end of the anode is, in fact, pressed in between two paper strips in such a way as to ensure that it is properly carried forward.

In a preferred embodiment of the machine according to the invention, two idle guide and pressure rollers are provided, at least one of which is mounted on a moving shaft; the cathode and a paper strip are guided onto a first roller while the other paper strip is guided onto a second roller. The rollers can be spaced apart to form an inlet or throat between the two paper strips and the free end of the anode fits into this throat. At the time the winding is commenced, the two rollers can be moved toward each other to close the intervening gap whereby the strips are tightly packed into a stack.

Furthermore, my improved machine is provided with reciprocable feed means preferably in the form of a carriage, moving along the anode infeed path, onto which the anode can be held by suction, so that it can be carried to the throat formed by the guide and pressure rollers.

These features of the invention, taken collectively, are particularly interesting in the event of the machine being called upon to produce multiple-anode capacitors. The pressure rollers, in fact, allow the formation - between them and the winding mandrel - of a rectilinear path for the strips with the commencing position (i.e. the point where they actually come into contact with the rollers) remaining unchanged as the winding progresses. Thus an infeed gripper - or better still, as preferred by me, a rectilinear-motion carriage is able to lead the free end of the anode to a correct gripping position, irrespective of the diameter of the winding already produced on the mandrel.

According to another important feature of my invention, the rotatable mandrels on the headstock consist each of a one-piece cylindrical pin with a slot running in the direction of the axis. The opposite faces of the slot are beveled to facilitate insertion of the strips. Each of the mandrels is mounted so as to be able not only to rotate for winding purposes but also to slide axially. There resides, obviously, an advantage in the use of a unitary mandrel - instead of one split into two parts axially movable in this manner. Naturally, the rotatary movement is likewise simplified. The use of a single slotted mandrel is of course made possible by the aforementioned provision of two pressure rollers. In fact, as previously stated, the juxtaposed strips run together in a straight line between the fixed position of the pressure rollers and the winding position. Thus, as the headstock rotates, one of the sloted mandrels, positioned at the rear of the head, can be displaced until its slot is aligned with the aforementioned common infeed path and can then be eased forward axially to allow the strips to engage with the diverging entrance lips of the slot. Preferably, furthermore, since the above-mentioned winding position is variable to suit, as already stated, the radial dimensions of the last-finished winding, the headstock is provided with a fixed shoulder which rests on the strips while it is rotating and moves them on to a fresh, precisely determined alignment position.

Other feature and numerous advantages of this invention will become apparent from the following description of a preferred but not exclusive embodiment which is given purely as an example, as illustrated in accompanying drawing in which.

Figure 2:
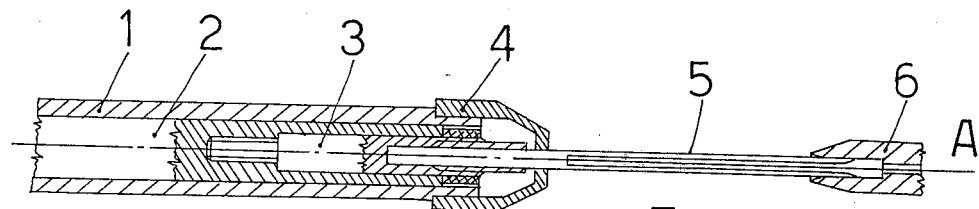
FIG. 2 shows a side view, in section of one of two rotatable, retractable, slotted mandrels with which the headstock of the machine of FIG. 1 is provided.

For clarity's sake, all mechanical, electrical and pneumatic parts pertaining to the operational sequence have been omitted, since they are considered to be of conventional type.

The winding machine according to the invention comprises, in a conventional manner, an headstock 32 rotating around a axis 24 and carrying two rotatable mandrels 5 and 5a. Four strips, i.e. two paper strips 15, 19 and two conductor strips 9, 20, are guided towards the mandrel 5 at position 21 by their respective infeed means (not shown). Almost at the end of the operation winding of the strips around the mandrel 5, the head 32 rotates through 180°and carries the mandrel 5 to position 21a where the resulting coil is sealed and automatically dislodged. While this is taking place, the mandrel 5a is moved from position 21a to position 21 and a new winding operation is commenced. The sealing of the coil is effected through an adhesive-retainer-tape dispenser 26. The dislodgement of the coil is brought about by the mandrel 5 sliding axially and thus extracting itself from the coil body.

The above corresponds substantially to conventional techniques.

The machine according to this invention, however, deviates in various respects from conventional structures.

In the first place, a feature of my invention provides for the juxtaposition of the strips differing from the normal techniques, in that the conductor strip 20, forming the cathode, is on the outside of the two paper strips 15 and 19 whereas the space between the latter two strips is left free for the insertion of the conductor strip 9, forming the anode.

Furthermore, pursuant to a further important feature, the strips 15, 9, 19 and 20 are made to converge not directly onto the winding mandrel, as is normally done, but towards a pair of guide and pressure rollers 16 and 17, upstream of that mandrel and thence, following a common rectilinear path, towards the winding mandrel itself.

The roller 17 is mounted idle on a fixed shaft whilst the roller 16 idles on a pin which is fixedly mounted on the end of a lever 13, pivoted at 12.

Figure 1:
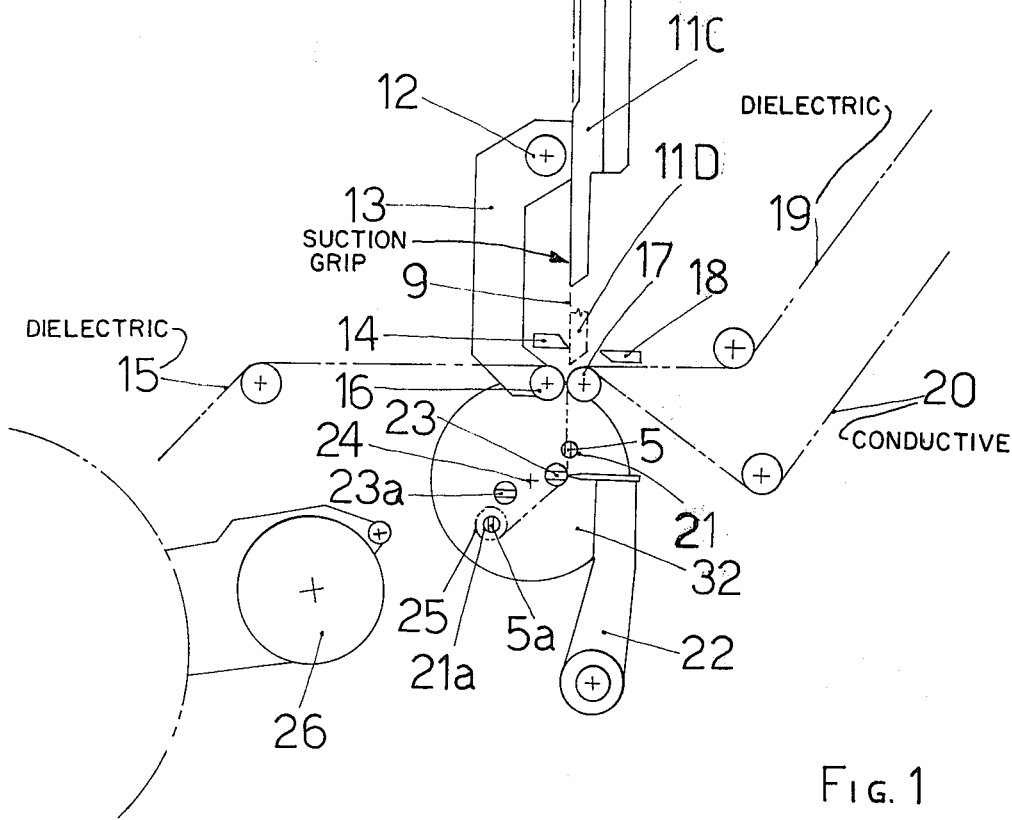
FIG. 1 represents a front schematic view of a machine in operation.

In accordance with an additional feature of my invention, the anode 9 is guided onto a roller 10 idling on a reciprocable carriage 11. The latter is movable between a retracted position 10C, shown in full lines in FIG. 1, and an advanced position 10D, shown in dotted lines, parallel to the path followed by the strip 9 and is provided with nonillustrated retaining means, in the form of vacuum devices, with which to grasp and entrain the strip 9. This is explained more fully later on in this text.

Figure 3:
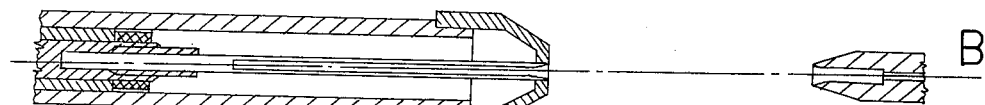
FIG. 3 illustrates one of the slotted mandrels in its retracted position for expulsion of a formed cartridge.
Figure 4:
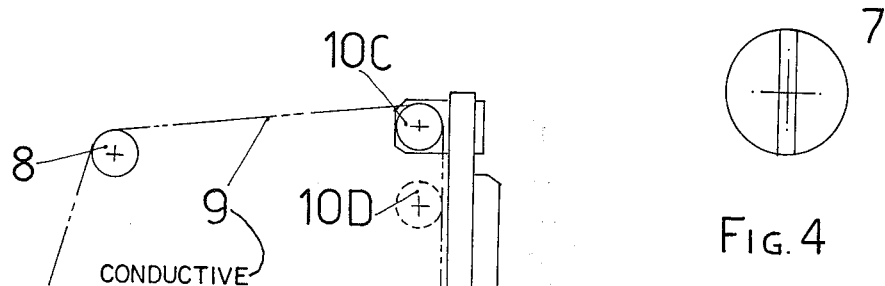
FIG. 4 is a front view, on an enlarged scale, of one of the mandrels.

Yet another important feature of the invention is that the winding mandrels 5 and 5a are made in one piece (see FIGS. 2 and 4) are each provided with a slot 7 extending in the direction of the axis. The axial slot 7 terminates, at the free end of the mandrel, in beveled edges to facilitate the insertion of the strips. The mandrel 5 is integral with a shank 3 which can slide and rotate inside the chamber 2 of a tubular support 1 forming part of the headstock 32. The mandrel 5 can adopt a working position (FIG. 2) in which it protrudes completely out of the end cap 4 on the tube 1 so that its free end can engage with a tailstock 6. In this position, the mandrel 5 is ready for operation winding. Once a winding has been completed and the resulting coil is to be dislodged, the mandrel 5 is axially withdrawn into the end cap 4 (FIG. 3) and is thus extracted from the freshly wound coil or cartridge which falls under its own weight. When the mandrel is returned from the retracted position it occupies in FIG. 3 to its extended position shown in FIG. 2, its engagement with the tailstock 6 is facilitated by the diverging edges of the latter. Thanks to this arrangement, the inlet end of the slot 7 of the mandrel may be slightly contracted to close its jaws around the engaged strips, as the mandrel enters the tailstock 6.

The machine also has two separate cutting means, i.e. one cutting mechanism just for the anode, consisting of a moving blade 18 and a counter-blade 14, and another for all the remaining strips, composed of a knife 22 and a pair of blocks 23a. In the latter cutting mechanism, the two separate blocks 23, 23a, are fixed to the head 32 in symmetrical positions and, in addition to their function as an anvil, are also able to serve as shoulders for deflecting the stack of strips, coming from rollers 16 and 17, into a position of exact alignment with a free mandrel. This will be explained more fully in the ensuing text.

The operation of the machine takes place in the following way. In the position shown in full lines on FIG. 1, with roller 10 at a location 10c, the knife 22 has just cut the strips against the block 23. Immediately after the cut, the mandrel 5 rotates to wind up the required lengths of the strips 15, 9, 19 and 20.

At the same time, the mandrel 5a is also rotating to finish the coil previously wound thereon and once the adhesive-retainer-tape dispenser 26 has approached it, that coil is sealed and immediately dislodged by retraction of the mandrel 5a into the head 32..

The mandrel 5 continues to wind until arrested by signal coming from the device for measuring the length of the strip 9 (as previously noted, the capacitance of the capacitor is determined by the length of the anode 9). At this juncture the knife 18 operates and cuts the anode 9 to the prescribed length.

Immediately after this, the head 32 commences rotating with its mandrels 5, 5a around its axis 24. During this rotation, and while the mandrel 5 is moving from the location 21 close to rollers 16, 17 to the location 21a remove therefrom, the strips 15, 19 and 20 continue to be gripped by the mandrel 5 together with the cut tail of the anode 9. While the mandrel 5 is moving to position 21a, the block 23a changes places with the block to 23 and this movement causes the stockel of strips 15, 19, 20, extending on a straight line, from the mandrel 5 to the rollers 16 and 17, to come to rest against the block 23a which thus deflects them exactly into the required alignment position. This alignment is determined in such a way that when the head 32 has rotated through 180° and the rollers 16 and 17 have closed the intervening gap, the axial plane of the slot 7 of the mandrel 5a in position 21 is also fully with the stock.

Figure 5:
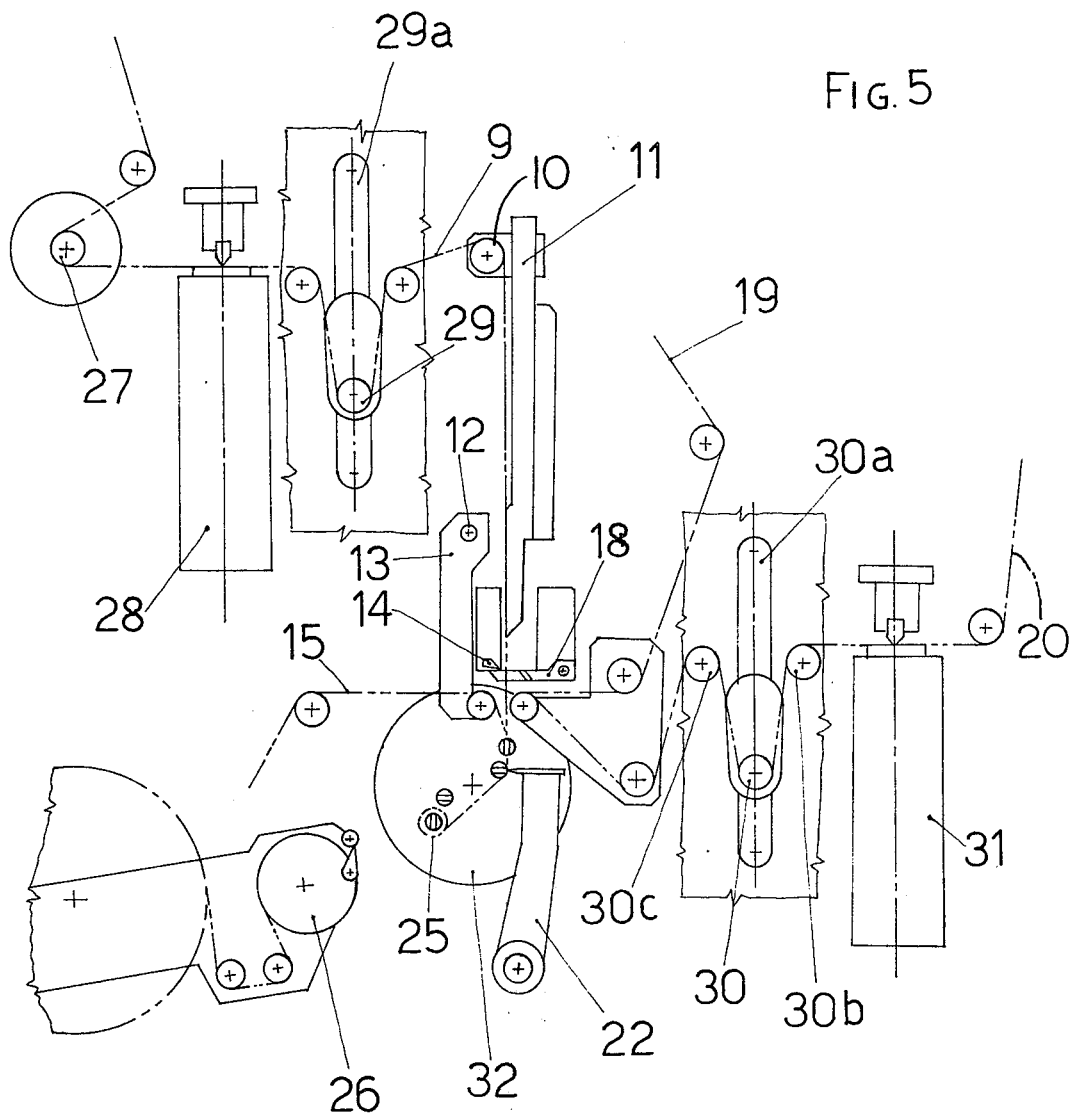
FIG. 5 represents the same machine as shown in FIG. 1, at a different operational stage, complete with the conductor-strip infeed units.

Before the head 32 has completed its 180° rotation, the lever 13 will have already oscillated sufficiently to move the roller 16 away from the roller 17 (see the position of FIG. 5). At the same time, the carriage 11 will have moved from the position 11c to the position 11D in which roller 10 occupies the position 10D, taking with it the strip 9 attached to it by suction. The forward position 11D of the carriage 11 is such that the free end of the strip 9 - i.e. the part which, after cutting, remains between the cutting means 14, and 18 and the tip of the carriage 11 - is carried between the two paper strips 15 and 19 way past the rollers 16 and 17 which, when spaced apart, form, a wedge shaped gap or throat into which the free end of the strip 9 can be inserted. Immediately afterwards, the rollers 16 and 17 are brought towards each other again and they under a pressure, which though slight, is sufficient to firmly keep a hold on the metallic strip 9 (also because of the friction applied by the dielectric and strips 15 and 19) once the carriage 11 is withdrawn. The rollers 16 and 17 are preferably fitted, furthermore, with a undirectionally effective freewheel mechanism so that the strips can move only forwards and not backwards.

With the end of the anode 9 thus properly inserted and held between the paper strips 15 and 19 and the contacting rollers 16 and 17, the mandrel 5 is then made to undergo an axial forward motion and, thanks to the perfect alignment of its slot 7 with the strips and the outward divergence of its lips, engaged the stacked strips and firmly grips them between the jaws. At this stage the strips are still kept taut since the cutting operation against the block 23 or 23a has yet to be accomplished.

What happens last, therefore, is that the knife 22 does the cutting and the mandrels 5 and 5a resume rotating about their respective axes. In position 21a, the rotation is purely for the application of the retainer tape, whereas in position 21 the capacitor is actually wound. It should be noted that at the time the strip engaging mandrel is in position 21 and starts rotating, it initially moves and winds up, for a short run, only the strips 15, 19 and 20 and then immediately afterwards also the strip 9 which at the outset is entrained by friction between the strips 15 and 19.

Thus, perfect insulation of the anode 9 from the cathode 20 is ensured.

The winding cycle described at the beginning is then resumed when capacitors with one single anode are being wound. If. instead, multiple-anode capacitors have to be manufactured, all that it is necessary to do is to keep the head 32 fixed until all the anodes have been wound and the process remains otherwise the same. If for example a capacitor with three anodes is to be formed, the winding commences, as previously described, with the rotation of the mandrel 5 and the rollers 16 and 17 in closed up position. Once the mandrel 5 has grasped the leading end of the anode, the roller 16 is moved away from the roller 17 to allow strip 9 to be correctly wound.

Upon completion of the first length of the anode, the machine halts, the cutting mechanism 14, 18 upstream of rollers 16, 17 comes into operation and the mandrel 5 rotates sufficiently to wind up the cut tail of the first anode 9 while, at the same time, the carriage 11 moves forward carrying the leading end of a second anode.

The rollers 16 and 17 are brought together again and the mandrel 5 resumes rotating in order to wind the second anode. These same operations are repeated for the third and any subsequent anode, until the final one has been wound. Upon completion of the last winding step and after the cutting downstream blades 14 and 18 have operated, the head 32 makes another half-turn and in order that a new capacitor can be produced. As can be readily appreciated, with the machine according to the invention no problems arise over the insertion of the free ends of the subsequent anodes since this is always done in the fixed position between the open spaced-apart rollers 16 and 17. Furthermore, the strips 15 and 19, bracketing the anode are always arranged in the shape of a converging throat or wedge and this facilitates their insertion even when the vertex of the wedge lies on the periphery of the already produced coil.

The machine according to the invention further comprises two assemblies 28 and 31 (shown in FIG. 5) for applying tabs or terminals to the conductor strips. These assemblies mainly consist of conventional devices for bonding - preferably cold welding - through which the conductor strips 9 and 20 pass. At fixed intervals, and when the strips are immobile, tabs of a conductor material are fixed to the strips to serve as the terminals of the capacitor.

Capacitor techniques require these tabs to be assembled in a predetermined position along the length of the anode and cathode, generally midway thereof. However, as can be easily understood, the length of the conductor strip between the cutting means and the welding device does not generally correspond to the prescribed length (i.e. to half the complete anode) and thus, once the machine has begun to wind and has absorbed a certain length of strip, it is necessary with conventional machines to halt the coiling in order to enable the welding operation to be performed. This factor obviously causes dead times which impair the productivity of the machine.

This problem is eliminated by the provision of two strip tensioning units 29 and 30 which are adjustable and constitute a further important feature of the invention. The units 29 and 30, shown in FIG. 5, are substantially identical and thus only the unit 30 will be described. This unit is provided with a pair of idle-rollers 30b and 30c, mounted on fixed spindles and an idle-roller 30, mounted on a pin which is movable on a slide 30d along a guide 30a. As shown, the strip 20 passes in succession over the rollers 30b, 30 and 30c before being routed to the winding device. The way in which the position of the roller 30 is adjusted, in comparison with the rollers 30b and 30c, thus makes it possible to vary the length of the path followed by the strip between these two rollers. By regulating the position of the roller 30 it is, therefore, possible also to regulate the total length of the run the strip follows between the welding unit 31 located upstream of tension unit 30) and the cutting means. In practice this is done so that the adjusted length of the path corresponds to the length as predetermined for the application of the tabs or terminals, in such a way that as soon as the machine comes to a halt for the strips to be cut, the welding unit can also carry out its operation without requiring any other intermediate stoppages.

It is of course understood that the invention is not limited to the embodiment, schematically outlined in this text and that numerous variants can be introduced, without thereby deviating from the scope of the invention as defined in the appended claims

I claim:

1. A machine for the automatic manufacture of electric capacitors with interleaved pairs of dielectric strips and conductive strips wound into a coil, comprising:
   a support provided with rotatable winding means;
   a pair of coacting guide members forming an entrance throat in line with said winding means;
   supply means for delivering two dielectric strips and an outer conductive strip to said guide members over separate paths converging at said entrance throat;
   reciprocable feed means intermittently engageable with an inner conductive strip for delivering a leading end thereof to said entrance throat between said dielectric strips for frictional entrainment thereby past said guide members to said winding means whereby said dielectric and conductive strips are interleaved in a stack of strips engageable by said winding means for being wound into a coil;
   first cutting means upstream of said guide members for severing said inner conductive strip independently of the other strips of said stack; and
   second cutting means downstream of said guide members for severing the remainder of said stack at a point beyond the trailing end of said inner conductive strip whereby the ends of said inner and outer conductive strips are relatively staggered in said coil.

2. A machine as defined in claim 1 wherein said guide members are provided with relatively movable mounting means for momentarily separating said guide members upon the approach of said reciprocable feed means, the latter being displaceable between the separated guide members for advancing the leading end of said inner conductive strip to the vicinity of said winding means.

3. A machine as defined in claim 2 wherein said guide members are rollers.

4. A machine as defined in claim 1 wherein said support is rotatable about an axis and said winding means comprises a pair of rotatable mandrels parallel to said axis mounted on said support at diametrically opposite locations, one of said locations being relatively close to said guide members, the other of said locations being relatively remote from said guide members, said mandrels being axially movable to engage said stack at said relatively close location and being longitudinally split to form jaws bracketing the engaged stack, rotation of said support about said axis through 180° upon severance of said inner conductive strip by said first cutting means moving a loaded mandrel into said relatively remote location while drawing said dielectric and outer conductive strips past said relatively close location for subsequent engagement by the other mandrel preparatorily to the winding of a new coil, said second cutting means being disposed between said locations.

5. A machine as defined in claim 4 wherein said second cutting means comprises a pair of diametrically opposite anvils on said support and a knife positioned for alternate coaction with said anvils in a position in which the coacting anvil aligns said stack with the jaws of the mandrel at said relatively close location.

6. A machine as defined in claim 5 wherein said jaws are provided with beveled edges facilitating engagement thereof with said stack prior to operation of said second cutting means.

7. A machine as defined in claim 6 wherein said support comprises a headstock confronting a tailstock, the mandrel at said relatively close location being aligned with said tailstock for engagement therewith upon axial displacement with closure of said jaws around the engaged stack, said mandrels being withdrawable into said headstock to dislodge a completed coil therefrom at said relatively remote location.

8. A machine as defined in claim 4, further comprising tape-dispensing means adjacent said relatively remote location for sealing a completed coil prior to removal thereof from one of said mandrels.

9. A machine as defined in claim 1 wherein said reciprocable feed means comprises a linearly movable carriage provided with suction means for gripping the leading end of said inner conductive strip.

* * * * *